US011380451B2

(12) United States Patent
Hunt et al.

(10) Patent No.: US 11,380,451 B2
(45) Date of Patent: Jul. 5, 2022

(54) DEPRESSURIZATION AND COOLANT INJECTION SYSTEMS FOR VERY SIMPLIFIED BOILING WATER REACTORS

(71) Applicant: GE-Hitachi Nuclear Energy Americas LLC, Wilmington, NC (US)

(72) Inventors: Brian S. Hunt, Wilmington, NC (US); Christer N. Dahlgren, Wilmington, NC (US); Wayne Marquino, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 157 days.

(21) Appl. No.: 15/677,380

(22) Filed: Aug. 15, 2017

(65) Prior Publication Data

US 2019/0057785 A1  Feb. 21, 2019

(51) Int. Cl.
*G21C 15/18* (2006.01)
*G21C 9/008* (2006.01)

(52) U.S. Cl.
CPC .............. *G21C 15/18* (2013.01); *G21C 9/008* (2013.01)

(58) Field of Classification Search
CPC .......... G21C 9/00; G21C 9/004; G21C 9/008; G21C 15/18; G21C 13/022; G21C 13/028; G21C 13/0285; F16K 17/16; F16K 17/162

(Continued)

(56) References Cited

U.S. PATENT DOCUMENTS 1,303,642 A * 5/1919 Ellert ...................... F16K 17/16
137/68.23
3,021,273 A   2/1962 Dix
(Continued)

FOREIGN PATENT DOCUMENTS

DE   1207024    12/1965
EP   3166114    5/2017
(Continued)

OTHER PUBLICATIONS

BS&B Safety Heads and Rupture Discks: Special Applications and Preventative Maintenance, Section B, BS&B Safety Systems, Catalog 77-1007, available at http://www.bsbsystems.com/downloads_catalog.html, accessed Feb. 25, 2019. (Year: 2007).*
(Continued)

*Primary Examiner* — Sharon M Davis
(74) *Attorney, Agent, or Firm* — Ryan Alley IP

(57) ABSTRACT

Simplified nuclear reactors include depressurization systems or gravity-driven injection systems or both. The systems depressurize and cool the reactor without operator intervention and power. An underground containment building may be used with the depressurization and injection systems passing through the same from above ground. Depressurization systems may use a rupture disk, relief line, pool, and filter to open the reactor and carry coolant away for condensation and exhausting. Injection systems may use a coolant tank above the nuclear reactor to inject liquid coolant by gravity into the reactor through an injection line and valve. The rupture disk and valve may be integral with the reactor and use penetration seals where systems pass through containment. Rupture disks and valves can actuate passively, at a pressure setpoint or other condition, through fluidic controls, setpoint failure, etc. The depressurization
(Continued)

system and injection system together feed-and-bleed coolant through the reactor.

19 Claims, 2 Drawing Sheets

(58) Field of Classification Search
USPC .................................... 220/89.2; 137/68.28
See application file for complete search history.

(56) References Cited

U.S. PATENT DOCUMENTS

| | | | |
|---|---|---|---|
| 3,454,466 A * | 7/1969 | Lemon | G21C 9/008 |
| | | | 376/283 |
| 3,712,851 A | 1/1973 | Isberg et al. | |
| 4,077,837 A * | 3/1978 | Schabert | G21C 9/00 |
| | | | 376/281 |
| 4,125,202 A * | 11/1978 | Schilling | G21C 13/087 |
| | | | 376/294 |
| 4,244,153 A | 1/1981 | Schwarzer et al. | |
| 4,347,942 A * | 9/1982 | Jernberg | F17C 13/06 |
| | | | 137/68.27 |
| 4,645,641 A | 2/1987 | Nicolai et al. | |
| 4,743,424 A * | 5/1988 | Elter | G21C 1/07 |
| | | | 376/226 |
| 4,826,652 A | 5/1989 | Schoening | |
| 4,863,677 A * | 9/1989 | Eckardt | G21C 9/004 |
| | | | 376/313 |
| 4,889,682 A | 12/1989 | Gou et al. | |
| 4,948,554 A | 8/1990 | Gou et al. | |
| 4,971,752 A | 11/1990 | Parker | |
| 5,059,385 A | 10/1991 | Gluntz et al. | |
| 5,106,571 A | 4/1992 | Wade et al. | |
| 5,126,099 A | 6/1992 | van Kuijk | |
| 5,223,208 A | 6/1993 | Ishimaru | |
| 5,282,230 A | 1/1994 | Billig et al. | |
| 5,377,243 A * | 12/1994 | Hill | G21C 15/18 |
| | | | 376/283 |
| 5,761,262 A | 6/1998 | No et al. | |
| 8,687,759 B2 | 4/2014 | Reyes et al. | |
| 9,583,224 B2 | 2/2017 | Moon et al. | |
| 9,721,685 B2 | 8/2017 | Malloy, III et al. | |
| 9,922,740 B2 | 3/2018 | Singh et al. | |
| 10,026,511 B2 | 7/2018 | Malloy, III et al. | |
| 10,115,487 B2 | 10/2018 | Singh et al. | |
| 10,115,488 B2 | 10/2018 | Han et al. | |
| 2007/0092053 A1 | 4/2007 | Sato | |
| 2008/0317193 A1 | 12/2008 | Sato | |
| 2012/0076255 A1 | 3/2012 | Jain et al. | |
| 2012/0243651 A1 | 9/2012 | Malloy | |
| 2013/0051511 A1 * | 2/2013 | Watson | G21C 9/004 |
| | | | 376/273 |
| 2013/0156143 A1 | 6/2013 | Bingham | |
| 2013/0272478 A1 * | 10/2013 | Malloy, III | G21C 13/02 |
| | | | 376/352 |
| 2014/0016734 A1 | 1/2014 | Moon et al. | |
| 2015/0131769 A1 * | 5/2015 | Larrion | A62B 1/02 |
| | | | 376/282 |
| 2015/0235718 A1 | 8/2015 | Freis et al. | |
| 2016/0027535 A1 | 1/2016 | Kanuch et al. | |
| 2016/0196885 A1 | 7/2016 | Singh et al. | |

FOREIGN PATENT DOCUMENTS

| | | |
|---|---|---|
| JP | 6031740 | 4/1994 |
| JP | 2016145726 | 8/2016 |
| KR | 101241142 | 3/2013 |
| KR | 102014009835 | 1/2014 |
| KR | 1020140037825 | 3/2014 |
| KR | 1020150041220 | 4/2015 |

OTHER PUBLICATIONS

GE-Hitachi Nuclear Energy, "The ESBWR Plant General Description" Jun. 1, 2011.
CCI, "CCI Nuclear Valve Resource Guide for Power Uprate and Productivity Gains" 2003.
Nuscale Power, "NuScale Module Small-Break Loss-of-Coolant Accident Phenomena Identification and Ranking Table" Jan. 2013.
Areva, "Passive Pressure Pulse Transmitter" 2014.
MPOWER, "B&W mPowerTM Integral Isolation Valve Technical Report" Nov. 11, 2013.
GE-Hitachi Nuclear Energy, "ABWR COPS Redesign—ABWR DCD Revision 6 Markups" (available at https://www.nrc.gov/docs/ML1616/ML16168A304.pdf) (retrieved Jun. 28, 2017).
WIPO, International Search Report in corresponding PCT Application PCT/US2018/000184, dated Feb. 14, 2019.
WIPO, Written Opinion in corresponding PCT Application PCT/US2018/000184, dated Feb. 14, 2019.
EPO, Partial European Search Report in corresponding EP Application 18845802.0, dated Mar. 16, 2021.
Rogers, "Underground Nuclear Power Plants" Bulletin of the Atomic Scientists, Oct. 1971, vol. 39.
Bruce, "Removing Heat from a Reactor in Shutdown" Mechanical Engineering, May 2011, p. 34-35, vol. 133.
Oka, "Implications and Lessons for Advances Reactor Design and Operation" Reflections on the Fukushima Daiichi Nuclear Accident, 2015, pp. 223-258, SpringerOpen.

* cited by examiner

DEPRESSURIZATION AND COOLANT INJECTION SYSTEMS FOR VERY SIMPLIFIED BOILING WATER REACTORS

BACKGROUND

FIG. 1 is a schematic of a containment building 36 that houses a reactor pressure vessel 42 with various configurations of fuel 41 and reactor internals for producing nuclear power in a related art economic simplified boiling water reactor (ESBWR). Reactor 42 is conventionally capable of producing and approved to produce several thousand megawatts of thermal energy through nuclear fission. Reactor 42 sits in a drywell 51, including upper drywell 54 and a lower drywell 3 that provides space surrounding and under reactor 42 for external components and personnel. Reactor 42 is typically several dozen meters high, and containment building 36 even higher, above ground elevation, to facilitate natural circulation cooling and construction from ground level. A sacrificial melt layer 1, called a basemat-internal melt arrest and coolability device, is positioned directly below reactor 1 to cool potential falling debris, melted reactor structures, and/or coolant and prevent their progression into a ground below containment 36.

Several different pools and flowpaths constitute an emergency core coolant system inside containment 36 to provide fluid coolant to reactor 26 in the case of a transient involving loss of cooling capacity in the plant. For example, containment 36 may include a pressure suppression chamber 58 surrounding reactor 42 in an annular or other fashion and holding suppression pool 59. Suppression pool 59 may include an emergency steam vent used to divert steam from a main steam line into suppression pool 59 for condensation and heat sinking, to prevent over-heating and over-pressurization of containment 36. Suppression pool 59 may also include flow paths that allow fluid flowing into drywell 54 to drain, or be pumped, into suppression pool 59. Suppression pool 59 may further include other heat-exchangers or drains configured to remove heat or pressure from containment 36 following a loss of coolant accident. An emergency core cooling system line and pump 10 may inject coolant from suppression pool 59 into reactor 42 to make up lost feedwater and/or other emergency coolant supply.

As shown in FIG. 1, a gravity-driven cooling system (GDCS) pool 37 can further provide coolant to reactor 42 via piping 57. A passive containment cooling system (PCCS) pool 65 may condense any steam inside containment 36, such as steam created through reactor depressurization to lower containment pressure or a main steam line break, and feed the condensed fluid back into GDCS pool 37. An isolation cooling system (ICS) pool 66 may take steam directly at pressure from reactor 42 and condense the same for recirculation back into rector 42. In extended or extreme transients, a DC-powered depressurization valve may be used to de-pressurize reactor 42 into containment 36, allowing easier coolant injection into reactor 42. These safety systems may be used in any combination in various reactor designs, each to the effect of preventing overheating and damage of core 41, reactor 42 and all other structures within containment 36 by supplying necessary coolant, removing heat, and/or reducing pressure. Several additional systems are typically present inside containment 36, and several other auxiliary systems are used in related art ESBWR. Such ESBWRs are described in "The ESBWR Plant General Description" by GE Hitachi Nuclear Energy, Jun. 1, 2011, incorporated herein by reference in its entirety, hereinafter referred to as "ESBWR."

SUMMARY

Example embodiments include simplified nuclear reactors with depressurization systems and/or gravity-driven injection systems that do not require operator intervention and power to operate to depressurize and/or cool the reactor, Example embodiment nuclear reactors may be surrounded by a containment building, potentially underground with the reactor, through which the depressurization and injection systems may pass, potentially from above ground. Example embodiment depressurization systems may include one or more rupture disks in series or parallel in the nuclear reactor that connect to a relief line to a pool and/or filter. A relief line connected to the rupture disk and configured to carry coolant away from the reactor following opening of the rupture disk. Example embodiment depressurization systems may use a pool into which the relief line drains, potentially outside of the containment and open to the atmosphere. The pool can condense any fluid flowing from the reactor while also scrubbing soluble and particulate matter from the fluid flow for safer release. An additional filter may screen out particulate matter from fluid exiting the pool to the atmosphere. Multiple, serial rupture disks can be used to passively depressurize the reactor at a setpoint pressure, such as 120% of operating pressure or a low liquid coolant level in the reactor, for example, as detected by a fluidic control and/or as caused by stress and/or temperature failure in the rupture disk(s) at the condition.

Example embodiment gravity-driven injection systems may use a coolant tank above the nuclear reactor to inject liquid coolant by gravity from the tank into the reactor. An injection line may join the tank and reactor across the containment. One or more valves can be used on the injection line and integral with the nuclear reactor, to stop coolant from flowing back toward the coolant tank from the nuclear reactor. Detectors or passive fluidic controls may open the valve to drive injection at determined conditions, such as low liquid coolant level approaching a top of the nuclear reactor core, or valves may be passively activated by the force of the rupture disk opening. Example embodiment depressurization system and injection systems, when used together, may feed-and-bleed coolant through an otherwise uncooled reactor without operator or active component intervention. For example, the depressurization system may lower a pressure of the nuclear reactor to a point where injection from the injection system tank is possible through gravity. The fluid coolant outflow from the depressurization system may be replenished by injection from the injection system, driven by gravity and a density gradient between the injection system connecting at a lower, cooler portion of the reactor and the depressurization system connecting at a higher, hotter portion of the reactor on opposite sides of the core.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
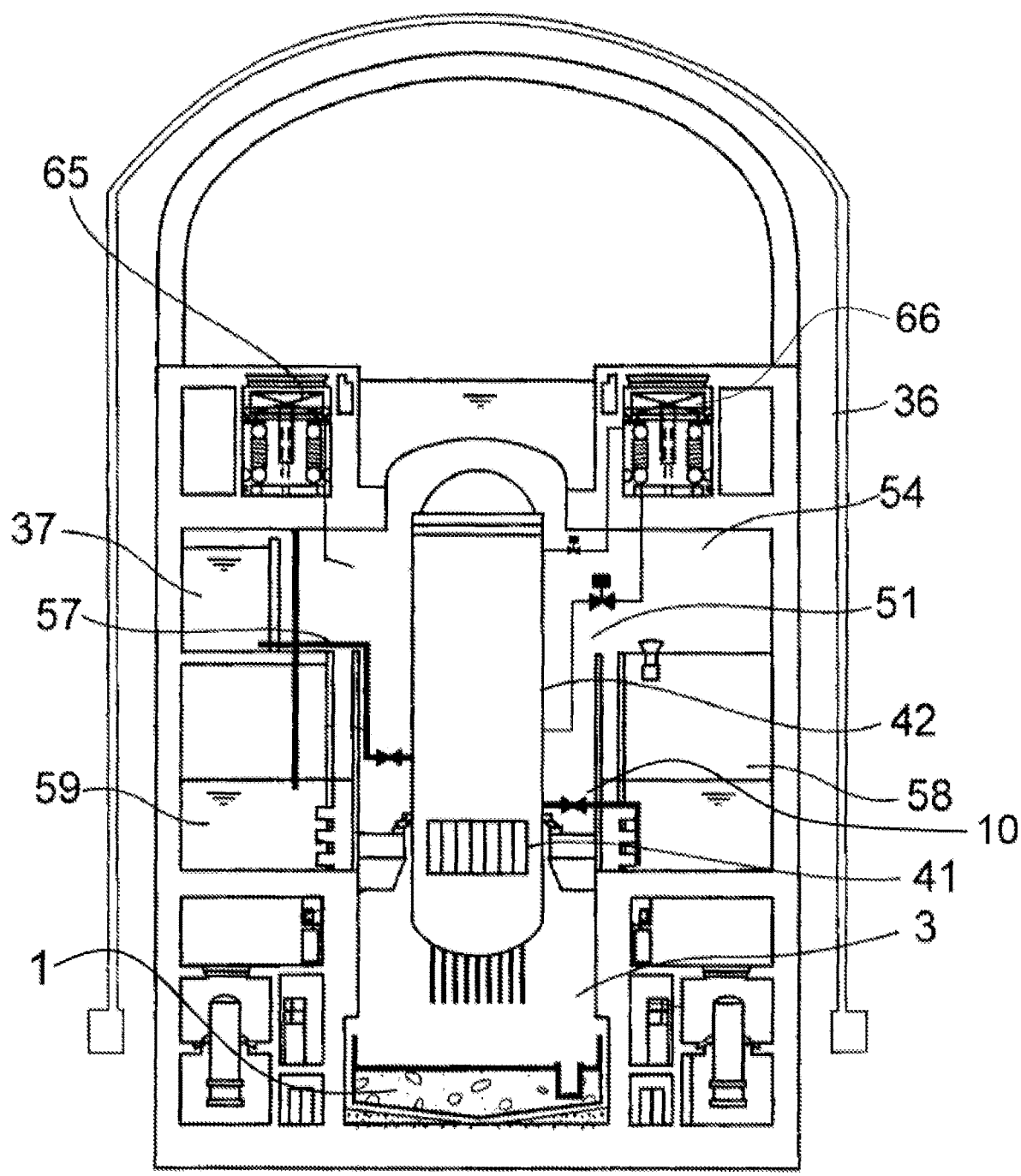
FIG. 1 is a schematic of a related art nuclear power containment and internals.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that during extreme transient scenarios that cause failures across multiple systems, actively- and/or passively-powered cooling systems may become inoperable or operate insufficiently, which results in reactor heat-up. Resulting pressurization of the reactor pressure vessel may make forced injection of additional coolant difficult as well as place the reactor vessel at risk of failure. Moreover, even if reactor pressure is vented, if a surrounding containment pressure cannot be vented, the reactor pressure will remain high and impede forced injection. Moreover, active remediation system, such as pumps, motor-controlled valves, and active sensors and actuators may likely also be unavailable in such a scenario as well as complexifying of reactor design. To overcome these newly-recognized problems as well as others, the inventors have developed example embodiments and methods described below to address these and other problems recognized by the inventors with unique solutions enabled by example embodiments.

The present invention is reactor depressurization and/or coolant injection systems, plants containing the same, and methods of operating such systems and plants. In contrast to the present invention, the few example embodiments and example methods discussed below illustrate just a subset of the variety of different configurations that can be used as and/or in connection with the present invention.

Figure 2:
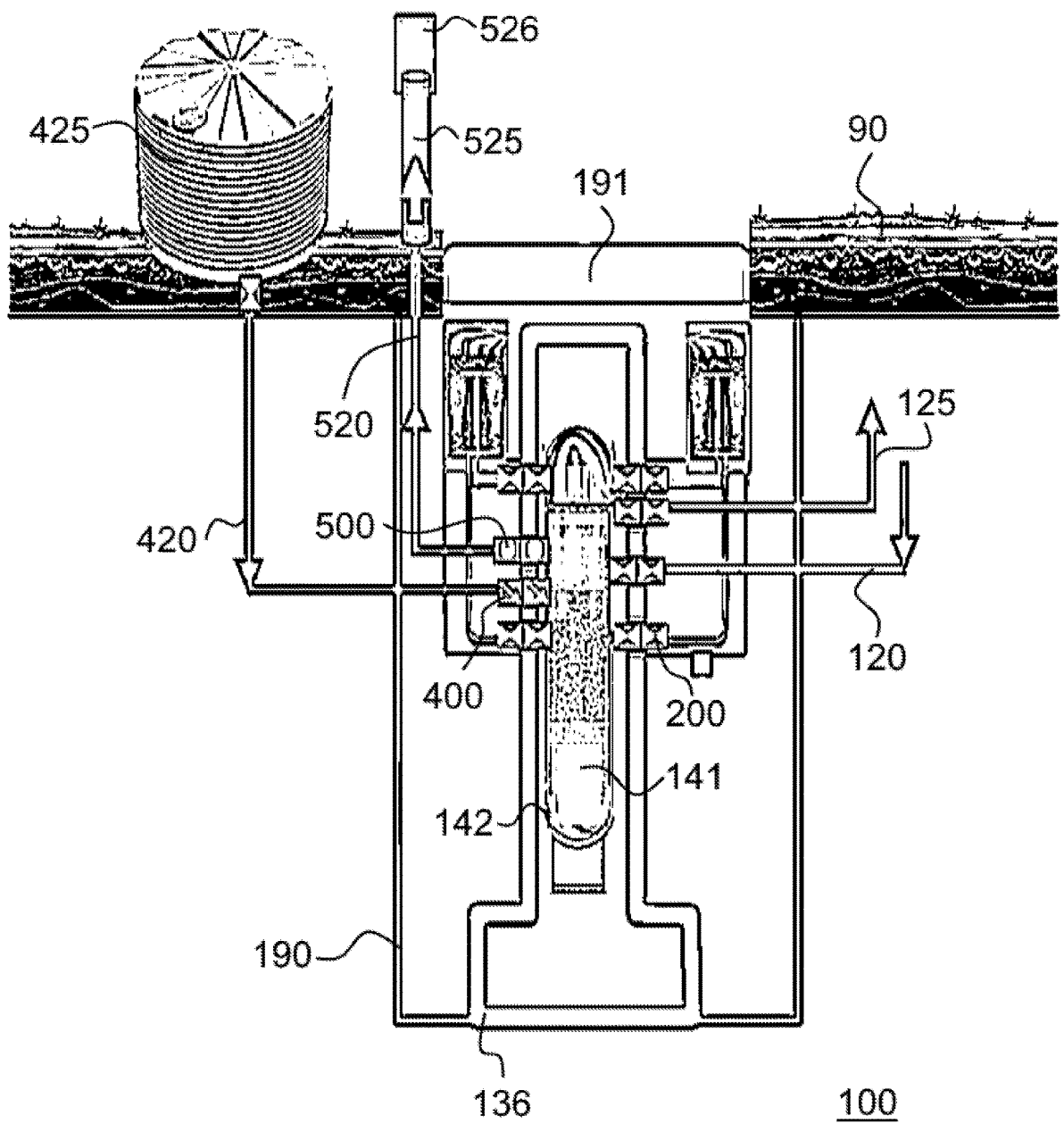
FIG. 2 is a schematic of an example embodiment very simplified boiling water nuclear reactor system.

FIG. 2 is a schematic of an example embodiment reactor system 100 including example embodiment reactor 142, example embodiment containment 136, and related cooling and power generation systems. System 100 is similar to systems described in co-owned application Ser. No. 15/585,162 to Hunt, Dahlgren, and Marquino, filed May 2, 2017 for VERY SIMPLIFIED BOILING WATER REACTORS FOR COMMERCIAL ELECTRICITY GENERATION, and co-owned application Ser. No. 15/635,400 to Hunt, Dahlgren, and Marquino, filed Jun. 28, 2017 for ISOLATION CONDENSER SYSTEMS FOR VERY SIMPLIFIED BOILING WATER REACTORS, both incorporated by reference herein in their entirety. Although not shown in FIG. 2, example embodiment system 100 is useable with conventional and known power generating equipment such as high- and low-pressure turbines, electrical generators, switchyards, condensers, cooling towers or heat sinks, etc., which may connect, for example to main feedwater line 120 and main steam line 125 in a similar fashion to any power generation facility.

Example embodiment containment 136 is composed of resilient, impermeable material for limiting migration of radioactive material and plant components in the case of a transient or accident scenario. For example, containment 136 may be an integrally-formed concrete structure, potentially with reinforcing internal steel or rebar skeleton, several inches or feet thick. Or, for example containment 136 may be a relatively smaller, all-steel body to enhance strength, radiation shielding, and lifespan of containment 136.

As shown in FIG. 2, example embodiment containment 136 may be underground, potentially housed in a reactor silo 190. A concrete lid 191 or other surface shield level with, or below, ground 90 may enclose silo 190 housing example embodiment reactor 142 and containment 136. Silo 190 and lid 191 may be seismically isolated or hardened to minimize any shock wave encountered from the ground and thus minimize impact of seismic events on reactor 142 and systems in silo 190. If underground as shown in FIG. 2, example embodiment system 100 may present an exceedingly small strike target and/or be hardened against surface impacts and explosions. Further, if underground, example embodiment system 100 may have additional containment against radioactive release and enable easier flooding in the case of emergency cooling. Although not shown, any electricity-generating equipment may be connected above ground without loss of these benefits, and/or such equipment may also be placed below ground.

Based on the smaller size of example embodiment reactor 142 discussed below, example embodiment containment 136 may be compact and simplified relative to existing nuclear power plants, including the ESBWR. Conventional operating and emergency equipment, including power-operated depressurization valves, coolant injection pumps, GDCS, PCCS, suppression pools, BiMac, backup batteries, wetwells, torii, etc. may be wholly omitted from containment 136. Containment 136 may be accessible through fewer access points as well, such as a single top access point under shield 191 that permits access to reactor 142 for refueling and maintenance. The relatively small volume of example embodiment reactor 142 and core 141 may not require a BiMac for floor arrest and cooling, because no realistic scenario exists for fuel relocation into containment 136; nonetheless, example embodiment containment 136 may have sufficient floor thickness and spread area to accommodate and cool any relocated core in its entirety, as shown in FIG. 2. Moreover, total penetrations through containment 136 may be minimized and/or isolated to reduce or effectively eliminate risk of leakage from containment 136.

Example embodiment reactor 142 may be a boiling-water type reactor, similar to approved ESBWR designs in reactor internals and height. Reactor 142 may be smaller than, such as one-fifth the volume of, ESBWRs, producing only up to 600 megawatts of electricity for example, with a proportionally smaller core 141, for example operating at less than 1000 megawatt-thermal. For example, example embodiment reactor 142 may be almost 28 meters in height and slightly over 3 meters in diameter, with internals matching ESBWR internals but scaled down proportionally in the transverse direction to operate at approximately 900 megawatt-thermal and 300 megawatt-electric ratings. Or, for example, reactor 142 may be a same proportion as an ESBWR, with an approximate 3.9 height-to-width ratio, scaled down to a smaller volume. Of course, other dimensions are useable with example embodiment reactor 142, with smaller height-to-width ratios such as 2.7, or 2.0, that may enable natural circulation at smaller sizes or proper flow path configuration inside the reactor.

Keeping a relatively larger height of example embodiment reactor 142 may preserve natural circulation effects achieved by known ESBWRs in example embodiment reactor 142. Similarly, smaller reactor 142 may more easily be positioned underground with associated cooling equipment and/or possess less overheating and damage risk due to smaller fuel inventory in core 141. Even further, smaller example embodiment reactor 142 with lower power rating may more readily satisfy modular power or peaking power demands, with easier startup, shutdown, and/or reduced power operations to better match energy demand.

A coolant loop, such as main feedwater line 120 and main steam line 125, may flow into reactor 142 to provide moderator, coolant, and/or heat transfer fluid for electricity generation. An emergency coolant source, such as one or more example embodiment isolation condenser systems (ICS) 300, may further provide emergency cooling to reactor 142 in the instance of loss of feedwater from line 120. Example embodiment ICS 300 may include steam inlet 162 from example embodiment reactor 142 and condensate return 163 to reactor 142. Each of these connections to reactor 142 may use isolation valves 200 that are integrally connected to reactor 142 inside containment 136 and represent negligible failure risk.

In the rare event of transient involving a failure to scram reactor 142 and/or complete failure of isolation condensers and feedwater, extreme remediation may be necessary to safely cool, depressurize, and/or shutdown reactor 142. However, DC power and complex valves or explosives may consume too much space in, or over-complicate, containment 136 and/or are generally unavailable and undesirable during such an extreme transient. A rupture disk 500 is present in a boundary of example embodiment reactor 142 to provide for passive, emergency depressurization.

Rupture disk 500 may be formed to automatically fail, or open reactor 142, at a pressure associated with failure of all other safety systems. For example, reactor 142 may have an operating pressure of several hundred, or over 300, psi, and ASME standard relief may be at 120% of this operating pressure, or over 360 psi. Rupture disk 500 may be configured to passively burst, fail, or open at this high pressure point without operator intervention or outside power or explosive. In this way, rupture disk 500 may automatically prevent example embodiment reactor 142 experiencing a transient from approaching a standard or design-basis failure point, without the use of any moving or powered valve. Of course, other setpoints for rupture disk 500 failure may be used, in accordance with desired functionality.

Rupture disk 500 may take on any physical characteristics to passively or automatically fail at a desired pressure. For example, rupture disk 500 may be formed of a selected material and thickness, or with a frangible seam, in a wall of reactor 142 so as to have a known stress failure point associated with the desired opening pressure, such as 120% of operating pressure of reactor 142. Rupture disk 500 may be integral with reactor 142 in the same way that isolation valves 200 are integral with reactor 142 so as to eliminate the consequences of pipe or valve failure inside containment 136. Where rupture disk 500 extends through containment 136 or connects to a conduit or pipe extending through containment 136, isolation seals (not shown) may prevent fluid passage outside of containment 136.

Rupture disk 500 may be placed at a higher elevation position in the reactor, such as well above core 141 near main steam leg 125, where pressure on reactor vessel 142 may be stable. A higher elevation for location of rupture disk 500 may also ensure that any steam and/or noncondensible gas in reactor 142 is vented first, as well as enhance any feed-and-bleed coolant flow loop as discussed below. Multiple rupture disks 500 may be serially placed integrally with reactor 142 as shown in FIG. 2. Duplicate rupture disks 500 may be relatively simple safeguards against spurious failure of any one rupture disk 500, while still all actuating, or opening reactor 142, at a desired setpoint.

Rupture disk 500, while useable as a sole means of emergency depressurization in the event of loss of reactor cooling, may also be used in combination with conventional emergency or standard safety relief valves on reactor 142 that relieve pressure into containment 136, such as an anticipated transient without scram emergency shutdown system that feeds boron into the reactor while bleeding off coolant and pressure through safety relief valves. In such an instance, containment 136 may become pressurized as safety relief valves release into containment 136. Such pressurization may delay or prevent actuation of rupture disk 500 that is set based on gauge pressure between reactor 142 and containment 136. A fluidic control discussed in the incorporated applications, or a mechanical linkage with such pressure relief valves, may actuate rupture disk 500 instead of gauge pressure in these instances.

As seen in FIG. 2, rupture disk 500 may drain to a relief line 520. While rupture disk 500 may alternatively open into containment 136 itself, the smaller size of containment 136 may cause pressurization of containment 136 in transient scenarios where rupture disk 500 has actuated. Relief line 520 can permit venting of reactor coolant outside of containment 136, avoiding pressurization of containment 136.

Relief line 520 may be a robust, isolated line traversing containment 136. Relief line 520 may run, potentially above ground 90, to a filtered vent that includes a pool of water 525 and/or particulate filter 526 that filters releases from reactor 142. For example, relief line 520, pool 525, and filter 526 may be similar in design to the containment overpressure protection system for ABWRs, including those described in GE-Hitachi, "ABWR COPS Redesign—ABWR DCD Revision 6 Markups," 2016, incorporated herein by reference in its entirety. Relief line 520 may open below the surface of pool 525, to partially or fully condense steam or other condensable fluid flowing out of reactor 142 as well as scrub particulates and dissolvable materials from the fluid. A vertical distance of relief line 520 and/or depth of pool 525 may limit flow rate and/or prevent explosive or shock flows into pool 525. Remaining gas exiting pool 525 may pass through filter 526, which may be a high-grade particulate filter, to entrap any radioactive particles and largely prevent radioactive release to the environment.

Because pool 525 may be above ground 90 and accessible outdoors, pool 525 may be readily filled or drained to an overflow area during a severe transient requiring its use. Similarly, filter 526 may be swapped and/or cleaned from an accessible position to prevent clogging and ensure particulate maximum entrapment. Of course, pool 525 and/or filter 526 may also be underground and even inside reactor silo 190 and/or containment 136. Similarly, pool 525 may also be a suppression pool with sparger outlets and sufficient volume configured to condense all steam or other condensable gasses flowing from reactor 142. By relieving pressure of reactor 142, rupture disk(s) 500, relief line 520, pool 525, and/or filter 526 may allow for refill or injection into reactor 142 at lower pressures, without pressurizing containment 136 or significant radiation release to the environment in the face of a severe transient that removes other reactor heat sinks and potentially power for active systems.

As seen in FIG. 2, an emergency gravity drain tank 425 and gravity injection line 420 flow into one or more valves 400 of example embodiment reactor 142. Gravity drain tank 425 may be above ground 90 to permit easy refill and maintenance of the same, in the event that additional coolant is desired. The fluid coolant in tank 425 may be borated or contain other additives that can be externally mixed in as the need arises. Gravity drain tank 425 may be seismically insulated and otherwise secured to reduce likelihood of loss to a same event affecting reactor 142.

At actuation, such as upon reactor depressurization, valves 400 open to permit gravity-driven coolant flow from tank 425 directly into reactor 142, such as into a downcomer annulus of reactor 142. Tank 425 may be a sufficient vertical distance above reactor 142 so as to inject at or above operating pressure of reactor 142. Valves 400 may be passively actuated, such as through a fluidic control that detects a low water level or other transient reactor condition. The fluidic control can then passively and selectively open valves 400 to permit gravity-driven injection of coolant from tank 425 into reactor 142. Or, for example, valves 400 may be mechanically opened by rupture of rupture disk 500, through direct force or a mechanical linkage, for example. Valves 400 may be closed by these controls when coolant levels are detected as normal, or valves 400 may remain open, providing a continuous coolant feed into reactor 142.

Valves 400 may be check valves and/or isolation valves with additional functions. As a check valve, only one-way flow may be permitted by valves 400 into reactor 142, or backflow up into tank 425 may be reduced or eliminated by a check valve functionality. Like other isolation valves 200 and junctions with reactor 142, valves 400 may be isolation valves integral with reactor 142 to prevent possibility of a coolant leak inside containment 136. For example, gate valves 210 and/or 220 from the incorporated '162 application may be check valves that allow one-way flow when used as valves 400, while still being integral with reactor 142.

In operation, gravity-driven drain tank 425 and pool 525 may provide a feed-and-bleed continuous coolant flow to reactor 142. For example, after actuation of rupture disk 500 and opening of valves 400, a one-way coolant flow path may be created from tank 425, through valve 400 into reactor 142, up through core 141, and then (as gas and/or liquid) out to pool 525 through rupture disk 500. Relative positioning and coolant levels in water tank 425 and pool 525, as well as positioning of valves 400 at a lower injection position of reactor 142 and positioning of rupture disks 500 at a higher outlet position of reactor 142, may provide both a gravity-driven and density-gradient-driven coolant flow path. In this way, even in an extreme emergency removing feedwater, ICS, and any other cooling system from reactor 142, core 141 may be kept depressurized and submerged in coolant for several days, greatly reducing risk of damage from overheat. This may be achieved passively and automatically at particular reactor pressures and/or coolant levels, without any required motor or pump in containment 136. Outflow from tank 425 may be throttled or discontinued through actuation of a local valve or removal of coolant sufficient to drive injection. Because valves 400 may be one-way check valves, coolant may not escape back up into tank 425 prior to reactor depressurization.

Although a single drain tank 425, pool 525, and associated piping and components are shown in FIG. 2, it is understood that multiple such components are useable in example embodiments. For example, for redundancy, multiple tanks 425 each with coolant volume adequate to cool reactor 142 for several days can individually drain into reactor 142 through shared or distinct gravity injection lines 420 and/or valves 400. This may particularly guard against a ground-based incident that renders some tanks 425 and offsite power unusable, while other tanks 425 remain for coolant after potentially several days. Similarly, multiple relief lines 520, rupture disks 500 and/or pools 525 and filters 526 may be used to provide redundant overpressure relief and coolant bleeding during such a transient scenario.

Example embodiment containment 136 may be sealed about any penetration, such as the robust relief line 520 and injection line 420, power systems, instrumentation, coolant cleanup lines, etc. The fewer penetrations, smaller size, lack of systems inside, and/or underground placement of containment 136 may permit a higher operating pressure, potentially up to near reactor pressures of several hundred, such as 300, psig without any leakage potential.

As seen in example embodiment reactor system 100, several different features permit significantly decreased loss of coolant probability, enable responsive and flexible power generation, reduce plant footprint and above-ground strike target, and/or simplify nuclear plant construction and operation. Especially by using known and approved ESBWR design elements with smaller volumes and core sizes, example embodiment reactor 142 may still benefit from passive safety features such as natural circulation inherent in the ESBWR design, while allowing a significantly smaller and simplified example embodiment containment 136 and reliance on gravity-driven coolant tank 425 and pool 525 outside containment 136 for redundant/catastrophic heat removal and/or depressurization.

Example embodiments and methods thus being described, it will be appreciated by one skilled in the art that example embodiments may be varied and substituted through routine experimentation while still falling within the scope of the following claims. For example, a variety of different coolants and fuel types are compatible with example embodiments and methods simply through proper operating and fueling of example embodiments—and fall within the scope of the claims. Such variations are not to be regarded as departure from the scope of these claims.

What is claimed is:

1. A simplified nuclear reactor system for commercially generating electricity, the system comprising:
 a nuclear reactor;
 a primary coolant loop connecting to the nuclear reactor;
 a containment surrounding the nuclear reactor; and
 a depressurization system including,
  a coolant tank and a filter pool vertically above the nuclear reactor outside the containment and including no flow path opening into the containment outside the nuclear reactor,
  an injection line crossing the containment and connecting the coolant tank and the nuclear reactor, wherein the injection line includes a closable and openable valve,
  a relief line crossing the containment and connecting the filter pool and the nuclear reactor, and
  a rupture disk connecting the relief line to the nuclear reactor, wherein the rupture disk is integral in a wall of the nuclear reactor so as to have material continuity with the wall, and wherein the rupture disk is configured to open the reactor at a pressure setpoint below failure of the reactor.

2. The system of claim 1, wherein
 the relief line is configured to carry coolant away from the reactor following opening of the rupture disk.

3. The system of claim 2, further comprising:
 wherein the relief line extends into and opens below a surface of the filter pool so as to exhaust the coolant into the filter pool for condensation and/or scrubbing.

4. The system of claim 3, wherein the filter pool includes a particulate filter configured to filter particulate matter out of gas exiting the filter pool to the atmosphere.

5. The system of claim 4, wherein the containment and the reactor are below ground, wherein the filter pool is above ground outside the containment, and wherein the relief line extends through the containment from the reactor to the filter pool.

6. The system of claim 1, wherein the depressurization system includes a plurality of the rupture disks in series, and wherein the pressure setpoint is about 120% of the operating pressure of the nuclear reactor.

7. The system of claim 1, wherein the rupture disk is configured to open the reactor by failure due to stress at the pressure setpoint.

8. The system of claim 1,
 wherein the depressurization system further includes a valve on the injection line and integral with the nuclear reactor, wherein the valve permits only injection of coolant from the coolant tank into the nuclear reactor.

9. A simplified nuclear reactor system for commercially generating electricity, the system comprising:
 a nuclear reactor;
 a primary coolant loop connecting to the nuclear reactor;
 a containment surrounding the nuclear reactor; and
 a gravity-driven injection system including,
  a coolant tank and a filter pool vertically above the nuclear reactor outside the containment and including no flow path opening into the containment outside the nuclear reactor,
  an injection line crossing the containment and connecting the coolant tank and the nuclear reactor, wherein the injection line includes a closable and openable valve, and wherein the valve and a wall of the nuclear reactor are integral so as to have material continuity, and
  a relief line crossing the containment and connecting the filter pool and the nuclear reactor, wherein the relief line is connected to the nuclear reactor by a rupture disk.

10. The system of claim 9, wherein the valve permits only injection of coolant from the coolant tank into the nuclear reactor.

11. The system of claim 10, wherein the valve is configured to passively open at detection of a low liquid level in the nuclear reactor.

12. The system of claim 9, wherein the nuclear reactor is completely underground and the coolant tank is above ground.

13. The system of claim 9,
 wherein the rupture disk is configured to open the reactor at a pressure setpoint below failure of the reactor.

14. The system of claim 13, wherein the
 relief line is configured to carry coolant away from the reactor following opening of the rupture disk.

15. The system of claim 14, wherein the injection line flows into the nuclear reactor at the valve at a first vertical position of a downcomer annulus in the nuclear reactor, and wherein the relief line flows out of the nuclear reactor at the rupture disk at a second vertical position of the reactor above a core of the nuclear reactor and above the first vertical position.

16. The system of claim 14, wherein the relief line extends into the filter pool so as to exhaust the coolant into the filter pool for condensation and/or scrubbing.

17. The system of claim 16, wherein the containment and the reactor are below ground, and wherein the filter pool and coolant tank are outside containment and above ground.

18. The system of claim 13, wherein the injection system is configured to lower a pressure of the nuclear reactor to a level where coolant will be injected from the coolant tank due to gravity.

19. A simplified nuclear reactor system for commercially generating electricity, the system comprising:
 a nuclear reactor;
 a primary coolant loop connecting to the nuclear reactor;
 a containment surrounding the nuclear reactor; and
 a gravity-driven injection system including,
  a coolant tank and a filter pool vertically above the nuclear reactor outside the containment and including no flow path opening into the containment outside the nuclear reactor,
  an injection line crossing the containment and connecting the coolant tank and the nuclear reactor, wherein the injection line includes a closable and openable valve, and a relief line crossing the containment and connecting the filter pool and the nuclear reactor, wherein the relief line is connected to the nuclear reactor by a rupture disk.

* * * * *